Figure 1:
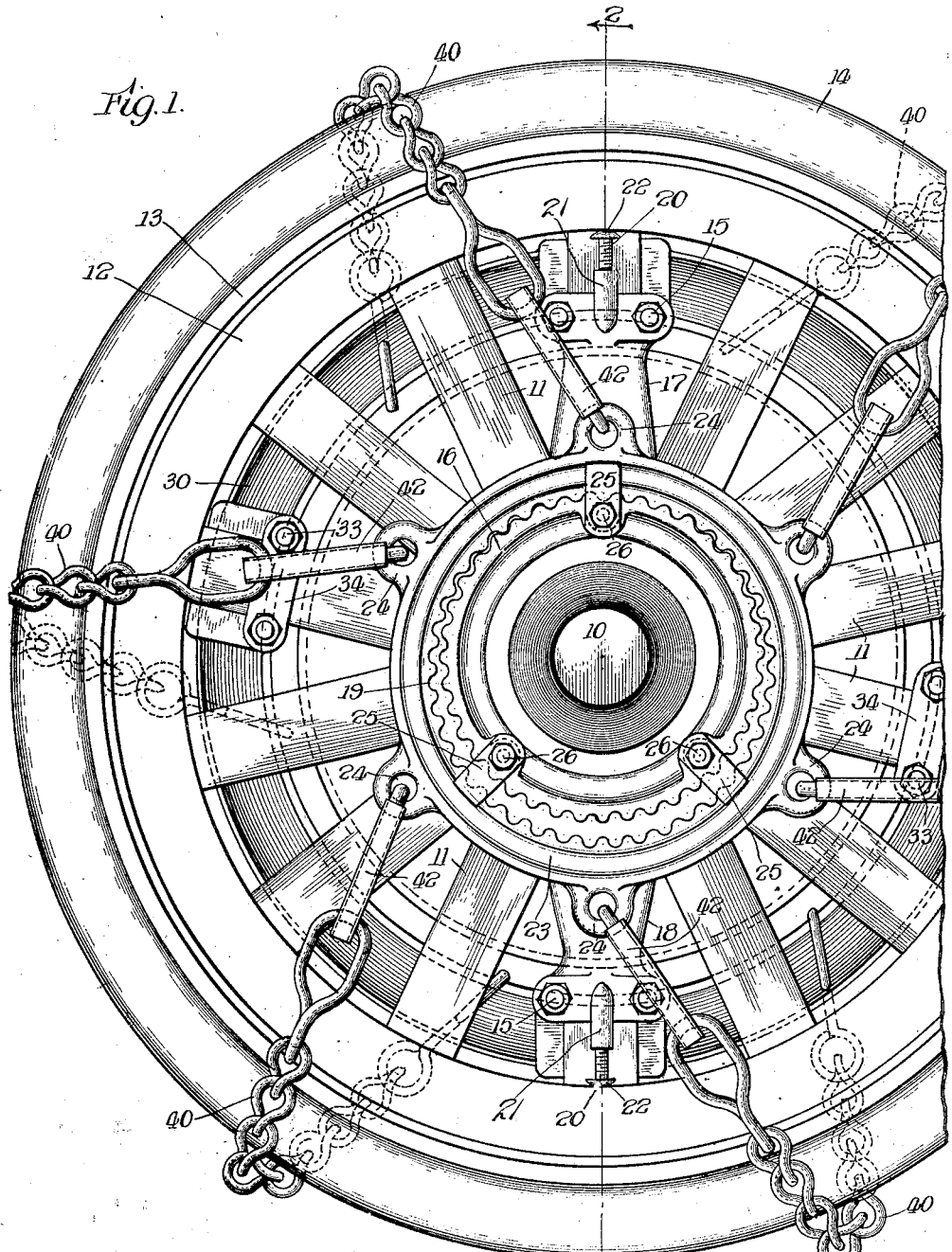

Oct. 30, 1923. 1,472,448
I. A. WEAVER
ANTISKID WHEEL CHAIN CONSTRUCTION
Filed Oct. 20, 1919 2 Sheets-Sheet 2

Witness:
A. J. Sauser.

Inventor:
Ira A. Weaver
By Walter M. Fuller
Atty.

Patented Oct. 30, 1923.

1,472,448

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

ANTISKID-WHEEL-CHAIN CONSTRUCTION.

Application filed October 20, 1919. Serial No. 331,797.

*To all whom it may concern:*

Be it known that I, IRA A. WEAVER, a citizen of the United States, residing at Springfield, in the county of Sangamon and State of Illinois, have invented certain new and useful Improvements in Antiskid-Wheel-Chain Constructions, of which the following is a specification.

My present invention concerns anti-skid or traction appliances for vehicle-wheels, such as those of automobiles, trucks, and the like.

The leading purpose is the provision of an apparatus of this general type using chains or corresponding elements extended across the face of the tire, which are free to creep while in operation thereby securing an even uniform wear on the tire and which when in contact with the road surface or pavement will not slip on the face of the tire. Stated somewhat differently, the prime object of the invention is to provide a chain or similar structure extended across the face of the wheel tire, which will travel with the face of the tire while in contact with the road-way, and which will change its position on the face of the tire before again coming into contact with the surface of the road, thereby evenly distributing the wear over the entire surface of the tire.

An added feature of this invention is the capability of applying one or more of the chains to the tire without the necessity of jacking up or elevating the wheel or rolling the wheel in relation to the road-way.

A further salient characteristic of the invention, particularly in the line of economy, is the employment only of short length chains, each chain being an individual unit, so that, in case one breaks or wears out, it will not affect the action or function of the remaining relatively short chains.

An additional purpose of the invention is to provide an appliance of such structure that the chain or chains will extend across the face of the tire at an angle or diagonally thus bringing about a smoother riding effect and a relatively-large contact with the face of the rubber tire. In the preferred embodiment of the invention one end of each cross-chain is secured to a member positively driven by the wheel, but at a speed slightly less than that of the wheel, so that during the revolution of the wheel the cross-chains will automatically change their positions slightly with respect to the face of the tire. The other ends of the chains are not positively driven, and therefore lag back and effect the diagonal or inclined disposition of the chains across the tire referred to above.

In order that those skilled in this art may have a full and complete understanding of the invention and its various functional advantages I have illustrated in the accompanying drawings, forming a part of this specification, a preferred and desirable embodiment of the invention and throughout the various views of this drawing like reference characters refer to the same parts.

Figure 2:
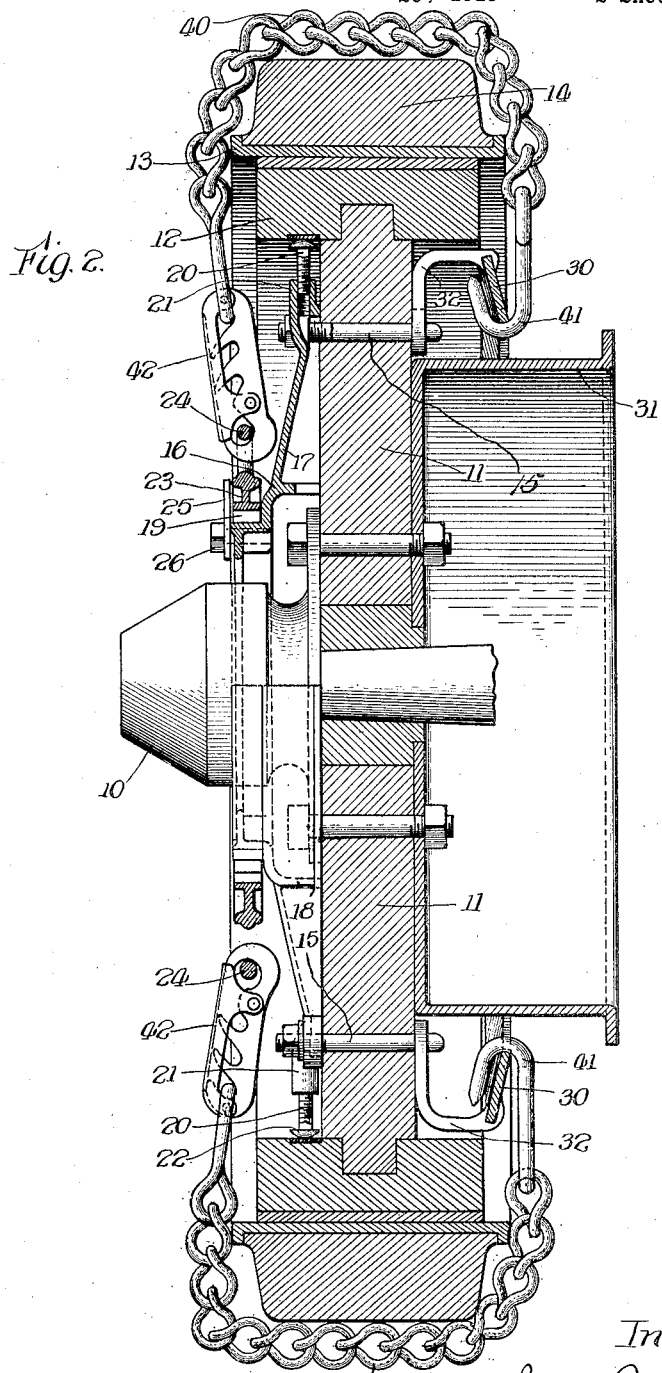

In such drawings:

Figure 1 is a face view of a vehicle-wheel, equipped with the improved anti-skid appliance; and Figure 2 is a substantially-central vertical section on line 2—2 through the apparatus shown in Figure 1.

Referring to the drawing it will be seen that the vehicle or truck wheel with which the novel and improved anti-skid appliance is adapted for association is of the usual and customary form and style and comprises a hub 10, radiating spokes 11, 11, a felly 12, a metal rim 13, and a solid, cushion, or pneumatic tire 14. Secured to the outer face of such spokes, by two U-bolts 15 encircling them, is an armed member or casting 16 of suitable conformation and having in the present case two opposite outstanding arms 17 and 18, by means of which the member 16 is fastened to the spokes of the wheel by the U-bolts referred to. Centrally at 19, that is, concentric with the axis of the wheel, this member has a spur-gear with thirty-nine teeth which is centered or positioned coaxially with the wheel, preliminary to the tightening of the U-bolts 15, by means of two oppositely-disposed adjusting screws 20, 20 taking into threaded sockets 21 in the ends of the diametrically-arranged arms 17 and 18 with their rounded heads 22 bearing against the inner surface of the wheel-felly. Inasmuch as the two wheel spokes to which such arms are thus fastened are directly opposite one another the members can be fully centered by these two adjustment screws.

Coacting or intermeshing with this spur-gear, which revolves with, or is driven by, the rotating vehicle-wheel, is a ring-gear 23 having forty internal teeth and six external or outstanding eyes or loops 24 for the attachment of the outer ends of the anti-skid chains. To maintain the two, companion, cooperating, gear elements in the same plane, the inner member 16 is fitted with a number of radiating or aligning clips or guards 25 overlapping the outer side of the ring-gear 23 and held in place by screws 26 taking into threaded holes in the member 16.

An inclined, flat, endless hoop or ring 30 is fastened to, but spaced inwardly away from, the inner face of the wheel, ordinarily surrounding the brake-drum 31, by a plurality of lateral arms or ears 32 held against the wheel spokes by the two U-bolts and another pair of like bolts 33 extended through apertured fasteners or plates 34 resting against the outer faces of the spokes.

The anti-skid or traction chains 40, six in the present case, each has at its end disposed at the inner side of the wheel a hook 41 taking over the inner or free edge of the supporting ring or hoop 30, such securing hooks being capable of sliding along the ring circumferentially around the wheel. The other or outer end of each of these chains is detachably fitted with an adjustable clasp or hook 42 of more or less usual construction engaging one of the eyes or loops 24, these chains desirably being of such length that they extend more or less diagonally across the face of the rubber tire as shown.

The operation of the appliance occurs practically as follows.

During the rotation of the wheel the diagonally or angularly disposed chains in a general way travel with it and function in the usual manner to secure adequate traction and to prevent skidding or slipping. The diagonal or inclined arrangement of the chains relatively to the tire tread or to the direction of travel create or result in smoother running and easier riding and a more extensive contact with the rubber tire than would occur were the chains disposed at right angles across the face of the tire. They may be likened to helical or spiral gears as compared with ordinary spur-gears. Owing to the fact that the ring-gear 23 to which the chains are attached has one more tooth than the coacting or driving inner spur-gear 21, such outer gear and the chains fastened thereto do not travel quite as fast as the wheel itself and hence during each revolution of the wheel the outer gear and its chains lose slightly in such travel, and the chains automatically progressively change their positions on the tread, thus subjecting all portions of the latter to even or equal wear and preventing the possibility of the chains remaining in one place and wearing grooves at such points in the tire. The inner ends of the chains lag behind, thus automatically preserving their desired diagonal arrangement and, as required by the slow travel of the chains around the periphery of the wheel, the hooks 41 slide along and around the hoop or ring 30.

When these chains come to position between the rubber tire and road-way they are held by their mountings from substantial movement on the tire, but during their travel when not in contact with the ground their positions are automatically shifted slightly by the positive driving mechanism, in other words, by the two intermeshing gears with different numbers of teeth.

This construction has the advantage that short lengths of chain are employed and as these wear out they are easily and relatively economically replaced. The removal or breaking of any chains does not interfere with the satisfactory and efficient operation of the remaining ones.

When there is no danger of skidding or sliding and the traction is adequate, the chains and their ring-gear may be readily removed by loosening and turning the catches or retainers 25, and when the chains are needed they and their common gear-ring may be relatively quickly replaced. Or, if preferred, the catches 42 may be unhooked from their eyes and the inner hooks 41 of the chains released from the supporting ring or hoop 30, being replaced in position when needed.

An understanding of this construction and its mode of operation will indicate to those skilled in this art the accomplishment of all of the above-specified purposes and objects of the invention, and such persons will appreciate that the invention is not limited and restricted to the precise and exact details of construction because these may be varied within comparatively wide limits without departure from the heart and essence of the invention and without the sacrifice of any of its substantial benefits and advantages. Stated somewhat differently, the invention is susceptible of a variety of different embodiments of which only one desirable one has been illustrated and described in detail, the scope of the invention being defined and outlined by the appended claims.

I claim:

1. In an anti-skid appliance of the character described adapted for association with a vehicle-wheel and its tire, the combination of anti-skid means adapted to extend across the tread of the vehicle-wheel tire at all times that it is associated with the tire, and positively-acting means to cause said anti-skid means to travel circumferentially around and relatively to the tire, substantially as described.

2. In an anti-skid appliance of the character described adapted for association with a vehicle-wheel and its tire, the combination of anti-skid means adapted to extend across the tread of the vehicle-wheel tire at all times that it is associated with the tire, and positively-acting means actuated by the wheel adapted to cause said anti-skid means to travel circumferentially around and relatively to the tire, substantially as described.

3. In an anti-skid appliance of the character described adapted for association with a vehicle-wheel and its tire, the combination of anti-skid means adapted to extend across the tread of the vehicle-wheel tire, and intermeshing gear means causing said anti-skid means to travel circumferentially around and relatively to the tire, substantially as described.

4. In an anti-skid appliance of the character described adapted for association with a vehicle-wheel and its tire, the combination of anti-skid means adapted to extend across the tread of the vehicle-wheel tire, and positively-acting means driven by the rotation of the wheel to cause said anti-skid means to travel circumferentially around and relatively to the wheel comprising intermeshing gears with different numbers of teeth, substantially as described.

5. In an anti-skid appliance of the character described adapted for association with a vehicle-wheel and its tire, the combination of anti-skid means adapted to extend across the tread of the vehicle-wheel tire, and positively-acting means to cause said anti-skid means to travel circumferentially around and relatively to the wheel comprising an internal gear to which said anti-skid means is connected and a gear adapted to be fastened to and revolve with the vehicle-wheel and in mesh with said internal gear, substantially as described.

6. In an anti-skid appliance of the character described adapted for association with a vehicle-wheel and its tire, the combination of flexible anti-skid means adapted to extend across the tread of the vehicle-wheel tire, means to support one end of said anti-skid means at one side of the tire and to permit travel thereof around the tire, and means connected to the other end of said anti-skid means at the opposite side of the tire acting to positively cause said anti-skid means to travel circumferentially around and relatively to the tire, substantially as described.

7. In an anti-skid appliance of the character described, adapted for association with a vehicle-wheel and its tire, the combination of anti-skid means adapted to extend across the tread of the vehicle-wheel tire, a ring secured to the wheel with which one end of such anti-skid means has a sliding connection, an internal gear connected to the other end of said anti-skid means, and a gear adapted to be rotated by the vehicle-wheel and in mesh with said internal gear positively causing a circumferential travel of said anti-skid means around and relatively to the wheel and its tire, substantially as described.

8. An anti-skid appliance of the character described adapted for association with a vehicle-wheel and its tire, including the combination of a plurality of cross-chains adapted to extend across the tread of the vehicle-wheel tire, supporting means common to all of said cross-chains, means to positively cause the travel of said supporting means around and relatively to the wheel, and detachable connections between said cross-chains and said supporting means, the latter substantially unchangingly performing its function regardless of the removal of a portion of such cross-chains, substantially as described.

IRA A. WEAVER.